(12) United States Patent
Kim et al.

(10) Patent No.: US 12,181,047 B2
(45) Date of Patent: *Dec. 31, 2024

(54) POWER TRANSMISSION DEVICE

(71) Applicants: Hyundai Motor Company, Seoul (KR); Kia Corporation, Seoul (KR)

(72) Inventors: Beom Su Kim, Yongin-si (KR); Sang In Park, Suwon-si (KR); Ju Young Yoon, Suwon-si (KR); Dong Jin Hyun, Suwon-si (KR); Hyo Seung Han, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 119 days.

This patent is subject to a terminal disclaimer.

(21) Appl. No.: 17/957,050

(22) Filed: Sep. 30, 2022

(65) Prior Publication Data

US 2023/0265915 A1 Aug. 24, 2023

(30) Foreign Application Priority Data

Feb. 18, 2022 (KR) ........................ 10-2022-0021687

(51) Int. Cl.
*F16H 9/10* (2006.01)
*F16H 19/00* (2006.01)

(52) U.S. Cl.
CPC ............. *F16H 9/10* (2013.01); *F16H 19/005* (2013.01)

(58) Field of Classification Search
CPC ........ F16H 19/005; F16H 9/10; F16H 19/003; B25J 9/104; B25J 9/0006; Y10T 74/20323
See application file for complete search history.

(56) References Cited

U.S. PATENT DOCUMENTS

| 5,046,375 | A | * | 9/1991 | Salisbury, Jr. | ........ F16H 19/005 74/89.22 |
| 5,912,658 | A | * | 6/1999 | Bergamasco | .......... B25J 9/0006 600/595 |
| 10,702,441 | B2 | * | 7/2020 | Julin | ........................ B25J 9/104 |
| 11,039,974 | B2 | | 6/2021 | Kodama et al. | |

(Continued)

FOREIGN PATENT DOCUMENTS

| KR | 20160111775 A | 9/2016 |
| KR | 20160119960 A | 10/2016 |

(Continued)

*Primary Examiner* — Jake Cook
(74) *Attorney, Agent, or Firm* — SLATER MATSIL, LLP

(57) ABSTRACT

An embodiment power transmission device includes an input shaft rotatable about a first rotation axis, first and second wires wound around an outer surface of the input shaft based on a first radial direction, each having a first side fixed to the input shaft, an output shaft rotatable about a second rotation axis, the output shaft including a shaft body, wherein the first and second wires surround an outer surface of the shaft body based on a second radial direction, and first and second wire holders to which a second side of the first wire and a second side of the second wire are respectively fixed. The first wire extends in a first circumferential direction of the shaft body, and then the first wire extends in a second circumferential direction opposite to the first circumferential direction of the shaft body.

20 Claims, 16 Drawing Sheets

(56) References Cited

U.S. PATENT DOCUMENTS

| | | | |
|---|---|---|---|
| 2011/0155517 A1* | 6/2011 | Zhang | B25J 9/102 188/65.2 |
| 2011/0167945 A1* | 7/2011 | Yang | B25J 17/0241 74/490.04 |
| 2020/0009719 A1 | 1/2020 | Scattareggia Marchese et al. | |
| 2021/0212879 A1 | 7/2021 | Efeber et al. | |

FOREIGN PATENT DOCUMENTS

| KR | 102009301 B1 | 8/2019 |
|---|---|---|
| KR | 102151230 B1 | 9/2020 |
| KR | 20210066981 A | 6/2021 |

* cited by examiner

POWER TRANSMISSION DEVICE

CROSS-REFERENCE TO RELATED APPLICATIONS

This application claims the benefit of Korean Patent Application No. 10-2022-0021687, filed on Feb. 18, 2022, which application is hereby incorporated herein by reference.

TECHNICAL FIELD

The present disclosure relates to a power transmission device.

BACKGROUND

As studies on robots are being actively conducted, studies on devices for implementing motions of the robots are also being actively conducted. For example, a robot configured to mimic a human motion needs to be equipped with devices capable of implementing motions of human joints, and studies on the devices are being conducted.

Meanwhile, the robot has a speed reducer that transmits a rotational force, which is received from a power source such as a motor, to another device after reducing a rotational speed. In the related art, examples of the speed reducer include a planetary gear speed reducer, a harmonic speed reducer, and the like.

However, the speed reducer in the related art generally has a large volume and a complicated structure. For this reason, there is a problem in that a lot of cost and time are required to manufacture the speed reducer, and loud noise and significant backlashes occur. In particular, it is essential to develop a new type of speed reducer with a reduced volume and simplified structure in a current situation in which there is an increasing demand for a robot having a structure lighter in weight than that in the related art.

SUMMARY

The present disclosure relates to a power transmission device. Particular embodiments relate to a power transmission device and a robot, which are capable of implementing a novel speed reduction mechanism.

Embodiments of the present disclosure provide a new type of speed reducer having a further reduced volume and a more simplified structure than those in the related art.

An exemplary embodiment of the present disclosure provides a power transmission device including an input shaft configured to be rotatable about a first rotation axis $A1$, first and second wires configured to be wound around an outer surface of the input shaft based on a radial direction $R1$ and each having one side fixed to the input shaft, an output shaft configured to be rotatable about a second rotation axis $A2$ and configured such that the first and second wires surround the output shaft, and first and second wire holders to which the other side of the first wire and the other side of the second wire are respectively fixed, in which the output shaft includes a shaft body configured to define a body of the output shaft and configured such that the first and second wires surround an outer surface of the shaft body based on a radial direction $R2$, in which the first wire extends from one side of the first wire to the other side of the first wire so that i) the first wire extends in a first circumferential direction $C1$ of the shaft body, and then ii) the first wire extends in a second circumferential direction $C2$ opposite to the first circumferential direction $C1$ of the shaft body.

The second wire may extend from one side of the second wire to the other side of the second wire so that i) the second wire may extend in the second circumferential direction $C2$ of the shaft body, and then ii) the second wire may extend in the first circumferential direction $C1$ of the shaft body.

The output shaft may further include a first protrusion region provided on the outer surface of the shaft body based on the radial direction $R2$ and protruding in the radial direction $R2$ of the shaft body, and the first wire may extend from one side of the first wire to the other side of the first wire so that i) the first wire may extend in the first circumferential direction $C1$ of the shaft body, ii) the first wire may be bent while surrounding the first protrusion region, and then iii) the first wire may extend in the second circumferential direction $C2$ of the shaft body.

The output shaft may further include a second protrusion region provided on the outer surface of the shaft body based on the radial direction $R2$ and protruding in the radial direction $R2$ of the shaft body, and the second wire may extend from one side of the second wire to the other side of the second wire so that i) the second wire may extend in the second circumferential direction $C2$ of the shaft body, ii) the second wire may be bent while surrounding the second protrusion region, and then iii) the second wire may extend in the first circumferential direction $C1$ of the shaft body.

The power transmission device may further include a base member provided at one side of the output shaft and configured such that the output shaft is rotatably coupled to the base member and a third protrusion region disposed at one side of the base member, and the first wire may extend from one side of the first wire to the other side of the first wire so that i) the first wire may extend from the input shaft toward the third protrusion region, ii) the first wire may be bent while surrounding the third protrusion region, and then iii) the first wire may extend in the first circumferential direction $C1$ of the shaft body.

A direction in which the third protrusion region protrudes from the base member may be parallel to the second rotation axis $A2$ which is a central axis about which the output shaft rotates.

The first and second wire holders may be provided below the output shaft, the first wire may extend upward from the first wire holder, and the second wire may extend upward from the second wire holder.

The third protrusion region may be spaced apart from the output shaft in a leftward/rightward direction P, and the second wire may extend from the second wire holder, pass through a space between the third protrusion region and the output shaft, and reach the second protrusion region.

A region of the first wire, which is bent around the third protrusion region and then surrounds the shaft body in the first circumferential direction $C1$, may intersect and be spaced apart from a region of the second wire which extends from the input shaft to the second protrusion region.

A distance in a leftward/rightward direction P between the output shaft and a region of the first wire, which is wound around the input shaft, may be longer than a distance in the leftward/rightward direction P between the output shaft and the region of the second wire which is wound around the input shaft.

The base member may include a recessed portion having a recessed shape and configured such that a part of the shaft body is inserted into the recessed portion, and interference between the recessed portion and a region of the shaft body inserted into the recessed portion may restrict a rotation range of the output shaft.

The power transmission device may further include an idler member provided to face the base member with the output shaft interposed therebetween, the idler member being coupled to the output shaft and configured to be rotatable relative to the output shaft, and the first wire may extend from one side of the first wire to the other side of the first wire so that i) the first wire may extend in the first circumferential direction C1 in a state of being in close contact with an outer surface of the idler member based on the radial direction R2, ii) the first wire may be bent while surrounding the first protrusion region, and then iii) the first wire may extend in the second circumferential direction C2 in a state of being in close contact with the outer surface of the shaft body based on the radial direction R2.

The second wire may extend from one side of the second wire to the other side of the second wire so that i) the second wire may extend in the second circumferential direction C2 in a state of being in close contact with the outer surface of the idler member based on the radial direction R2, ii) the second wire may be bent while surrounding the second protrusion region, and then iii) the second wire may extend in the first circumferential direction C1 in a state of being in close contact with the outer surface of the shaft body based on the radial direction R2.

The power transmission device may further include a fourth protrusion region provided at one side of the base member and having an outer surface with which the first wire is in close contact, the first wire may be bent in a region of the first wire being in close contact with the fourth protrusion region, and the fourth protrusion region may be provided between the output shaft and the first wire holder based on a direction in which the first wire extends.

A radius of the shaft body based on the radial direction R2 of the shaft body may correspond to a radius of the idler member.

The idler member may include a groove region recessed inward from the outer surface of the shaft body based on the radial direction R2 and extending in the circumferential directions C1 and C2, and regions of the first and second wires, which are in close contact with the idler member, may be in close contact with the groove region.

A region of the first wire, which is in close contact with the groove region, and a region of the second wire, which is in close contact with the groove region, may be coincident with each other in a width direction W of the idler member.

A region of the first wire, which is in close contact with the groove region, and a region of the second wire, which is in close contact with the groove region, may be spaced apart from each other in a width direction W of the idler member.

The groove region may include a first groove region and a second groove region spaced apart from the first groove region in a width direction W of the idler member, the first wire may be in close contact with the first groove region, and the second wire may be in close contact with the second groove region.

A center of the first protrusion region and a center of the second protrusion region may be coincident with each other in a width direction W of the output shaft.

A center of the first protrusion region and a center of the second protrusion region may be spaced apart from each other in a width direction W of the output shaft.

The center of the first protrusion region may be further spaced apart outward from the base member than the center of the second protrusion region.

A region of the first wire, which surrounds the third protrusion region, may become distant from the base member as the region of the first wire becomes closer to the shaft body.

The input shaft may include a first sliding member disposed on the outer surface of the input shaft based on the radial direction R1 and having a first screw thread region having a recessed shape and configured to accommodate the first wire, and an insertion member inserted into an internal space of the first sliding member in a direction parallel to the first rotation axis A1, and the first sliding member may be movable relative to the insertion member in the direction parallel to the first rotation axis A1.

The input shaft may further include a roller member fixed to an outer peripheral surface of the insertion member and configured to be rotatable so that the first sliding member slides relative to the insertion member.

The input shaft may further include a second sliding member disposed on the outer surface of the input shaft based on the radial direction R1 and having a second screw thread region having a recessed shape and configured to accommodate the second wire, and the second sliding member may be movable relative to the insertion member in the direction parallel to the first rotation axis A1.

The roller member may be provided in plural, the plurality of roller members may be disposed in the direction parallel to the first rotation axis A1, some of the roller members may face the first sliding member, and the other roller members may face the second sliding member.

Inner peripheral recessed regions each having a recessed shape corresponding to the roller member may be formed in inner peripheral surfaces of the first and second sliding members, and the roller members may be inserted into the inner peripheral recessed regions.

A fixing hole may be formed in the outer surface of the input shaft based on the radial direction R1, one end of the first wire may be fixedly inserted into the fixing hole, and at a point at which the first wire begins to be inserted into the fixing hole, an angle defined between a tangential direction of the first wire and a direction in which the fixing hole extends may be larger than 90 degrees or an obtuse angle.

Accommodation spaces may be formed in the base member and accommodate the first and second wire holders, the first and second wire holders may be respectively inserted into the accommodation spaces, and the first and second wire holders may be movable in the accommodation spaces.

Internal thread regions may be formed in the first and second wire holders, respectively, and external thread members may be inserted into and coupled to the internal thread regions.

In the regions in which the first and second wire holders are inserted into the accommodation spaces, a cross-section of each of the accommodation spaces based on a direction perpendicular to a longitudinal direction of the external thread member may have a polygonal shape, and a cross-section of each of the first and second wire holders based on the direction perpendicular to the longitudinal direction of the external thread member may have a polygonal shape.

The polygonal shape may be a quadrangular shape.

The shaft body may include a body region having an outer peripheral recessed region formed in a shape recessed inward from an outer peripheral surface of the body region, and a block region inserted into the outer peripheral recessed region and having the first and second protrusion regions formed on the outer surface of the shaft body based on the radial direction R2.

The output shaft may further include pressure sensor members provided in regions in which the block region and the body region face each other in the first and second circumferential directions C1 and C2.

A direction perpendicular to a surface of the block region which is in close contact with the pressure sensor member may be parallel to a direction in which the first wire extends from the first protrusion region and a direction in which the second wire extends from the second protrusion region.

The power transmission device may further include a first bearing coupled to the output shaft and the idler member, and the first bearing may include a first inner race coupled to the shaft body, a first outer race coupled to the idler member, and a first rolling element provided between the first inner race and the first outer race.

The power transmission device may further include a second bearing coupled to the output shaft and the base member, and the second bearing may include a second inner race coupled to the shaft body, a second outer race coupled to the base member, and a second rolling element provided between the second inner race and the second outer race.

Another exemplary embodiment of the present disclosure provides a robot including the power transmission device and a rotary member configured to rotate by receiving a rotational force from the power transmission device, in which the rotary member is fixed relative to the output shaft.

According to embodiments of the present disclosure, it is possible to provide a new type of speed reducer having a further reduced volume and a more simplified structure than that in the related art.

DETAILED DESCRIPTION OF ILLUSTRATIVE EMBODIMENTS

Hereinafter, a power transmission device and a robot according to embodiments of the present disclosure will be described with reference to the drawings.

Power Transmission Device

Figure 1:
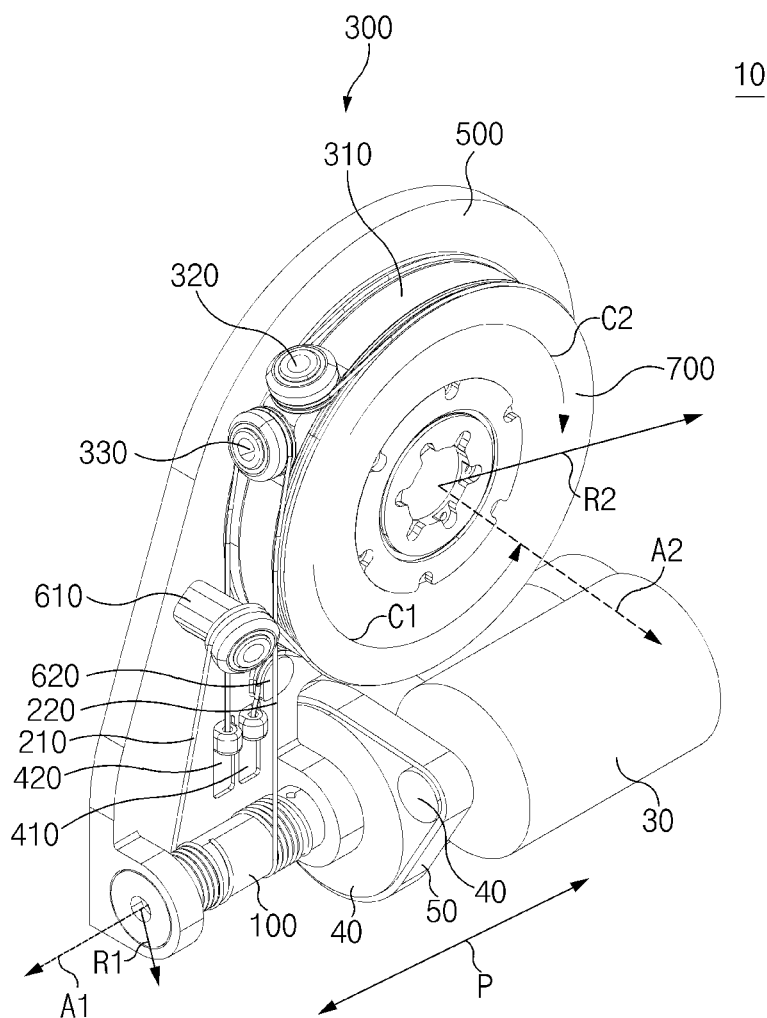
FIG. 1 is a perspective view illustrating a structure of a power transmission device according to embodiments of the present disclosure.
Figure 2:
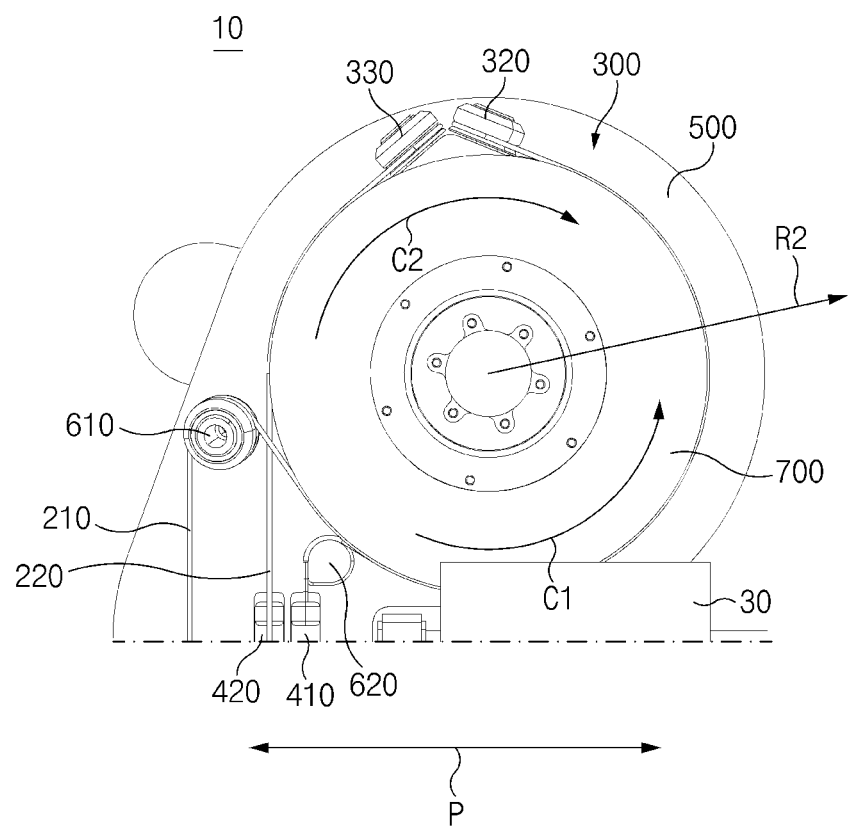
FIG. 2 is a front view illustrating the structure of the power transmission device according to embodiments of the present disclosure.
Figure 3:
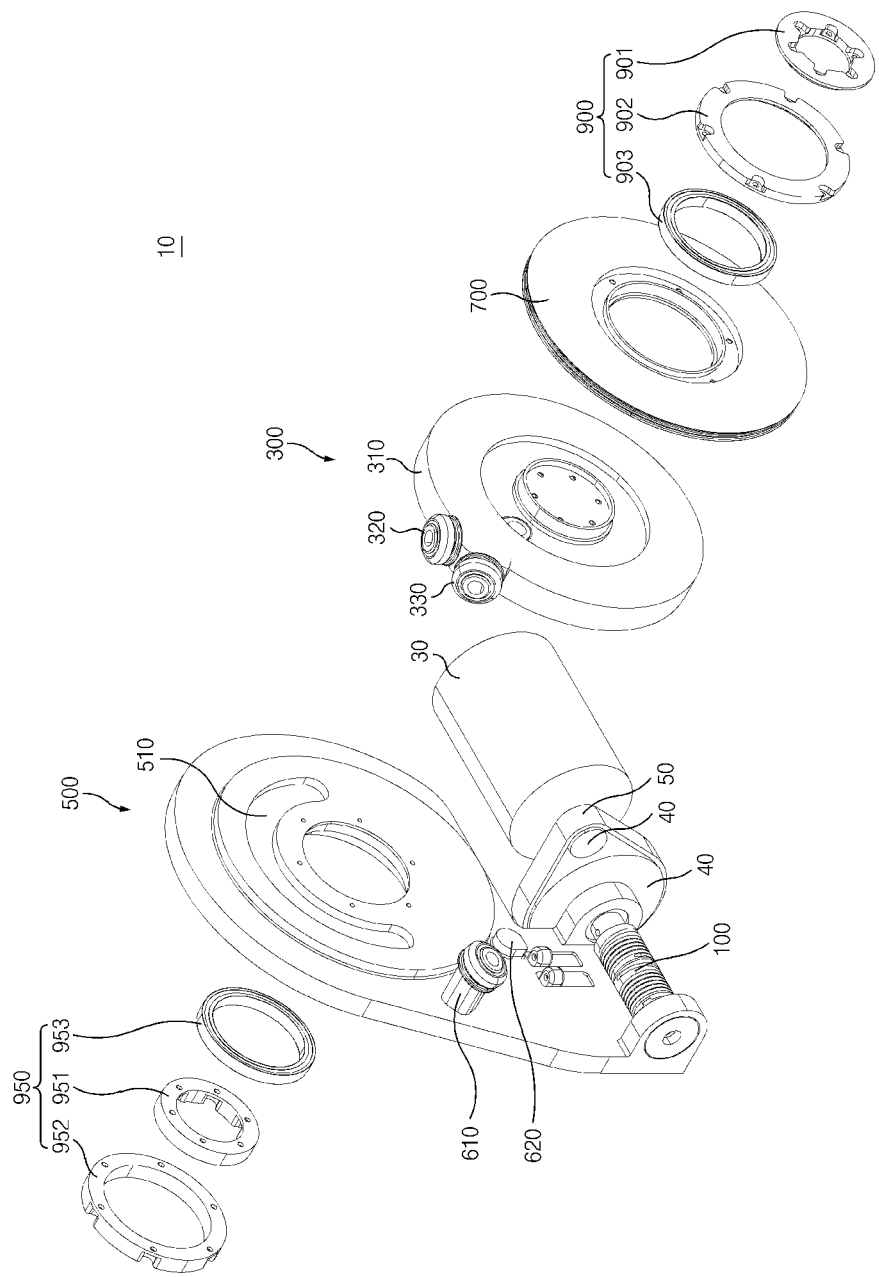
FIG. 3 is an exploded view of the power transmission device according to embodiments of the present disclosure.

FIG. 1 is a perspective view illustrating a structure of a power transmission device according to embodiments of the present disclosure, and FIG. 2 is a front view illustrating the structure of the power transmission device according to embodiments of the present disclosure. FIG. 3 is an exploded view of the power transmission device according to embodiments of the present disclosure.

A power transmission device 10 according to embodiments of the present disclosure may be configured to transmit power to the outside after reducing a rotational force. In particular, the power transmission device 10 according to embodiments of the present disclosure may have a novel, simple structure in comparison with a speed reducer in the related art and reduce noise and backlashes in comparison with the speed reducer in the related art.

As illustrated in FIGS. 1 to 3, the power transmission device 10 may include an input shaft 100 provided to be rotatable about a first rotation axis A1, and first and second wires 210 and 220 configured to be wound around an outer surface of the input shaft based on a radial direction R1 and each having one side fixed to the input shaft 100. In particular, as described below, the input shaft 100 may move forward or rearward in a direction parallel to the first rotation axis A1 while rotating about the first rotation axis A1. The first rotation axis A1 may be understood as an imaginary axis introduced for convenience to describe a motion direction of the input shaft 100.

The power transmission device 10 may include an output shaft 300 provided to be rotatable about a second rotation axis A2, and the first and second wires 210 and 220 surround the output shaft 300. The first rotation axis A1 and the second rotation axis A2 may intersect each other. FIG. 1 illustrates that the first rotation axis A1 is defined in parallel with a leftward/rightward direction P of the power transmission device 10, and the second rotation axis A2 is defined in parallel with a forward/rearward direction of the power transmission device 10.

According to embodiments of the present disclosure, when the input shaft 100 rotates, a rotational force of the input shaft 100 may be transmitted to the first and second wires 210 and 220, and the output shaft 300 may be rotated by tension of the first and second wires 210 and 220. In particular, according to embodiments of the present disclosure, a rotation angular velocity of the output shaft 300 may be lower than a rotation angular velocity of the input shaft 100, such that the power transmission device 10 may implement a speed reduction function. Meanwhile, FIG. 1 illustrates that the power transmission device 10 includes a drive motor 30 including a rotary shaft, two pulley members 40 respectively connected to the input shaft and the rotary shaft of the drive motor 30, and a belt member 50 configured to connect the two pulley members 40. In this case, an additional speed reduction function may be implemented as the rotational force of the drive motor 30 is transmitted to the input shaft 100. Alternatively, the drive motor 30 may be connected directly to the input shaft 100, and a separate gear member may be provided between the drive motor 30 and the input shaft 100 to implement the speed reduction function.

Referring to FIGS. 1 to 3, the power transmission device 10 may include first and second wire holders 410 and 420 respectively fixed to the other side of the first wire 210 and the other side of the second wire 220. That is, according to embodiments of the present disclosure, one side and the other side of the first wire 210 may be respectively fixed to the input shaft 100 and the first wire holder 410, and one side and the other side of the second wire 220 may be respectively fixed to the input shaft 100 and the second wire holder 420, such that predetermined tension may be applied to the first and second wires 210 and 220.

Meanwhile, the output shaft 300 may include a shaft body 310 configured to define a body of the output shaft 300, and the first and second wires 210 and 220 surround an outer surface of the shaft body 310 based on a radial direction R2. In particular, as described below, a partial region of the first wire 210 and a partial region of the second wire 220 may be in close contact with the outer surface of the shaft body 310 based on the radial direction R2. Therefore, when the first and second wires 210 and 220 are moved by the rotation of the input shaft 100, the shaft body 310 may be rotated by the tension of the first and second wires 210 and 220, and thus the output shaft 300 may be rotated about the second rotation axis A2.

In particular, according to embodiments of the present disclosure, a direction in which the first wire 210 surrounds the shaft body 310 may be different from a direction in which the second wire 220 surrounds the shaft body 310.

More specifically, referring to FIGS. 1 and 2, the first wire 210 may extend from one side of the first wire 210 (i.e., a region fixed to the input shaft) to the other side of the first wire 210 (i.e., a region fixed to the first wire holder) so that i) the first wire 210 may extend in a first circumferential direction C1 of the shaft body 310, and then ii) the first wire 210 may extend in a second circumferential direction C2 opposite to the first circumferential direction C1 of the shaft body 310. In addition, the second wire 220 may extend from one side of the second wire 220 (i.e., a region fixed to the input shaft) to the other side of the second wire 220 (i.e., a region fixed to the second wire holder) so that i) the second wire 220 may extend in the second circumferential direction C2 of the shaft body 310, and then ii) the second wire 220 may extend in the first circumferential direction C1 of the shaft body 310.

Therefore, according to embodiments of the present disclosure, when the first wire 210 is wound around the input shaft 100 by the rotation of the input shaft 100, the second wire 220 is unwound from the input shaft 100. In this case, the output shaft 300 rotates in the second circumferential direction C2.

On the contrary, when the second wire 220 is wound around the input shaft 100 by the rotation of the input shaft 100, the first wire 210 is unwound from the input shaft 100. In this case, the output shaft 300 rotates in the first circumferential direction C1.

Meanwhile, referring to FIGS. 1 to 3, the output shaft 300 may further include protrusion regions configured to bend the first and second wires 210 and 220 so that the directions in which the first and second wires 210 and 220 extend are changed.

More specifically, the output shaft 300 may further include a first protrusion region 320 provided on the outer surface of the shaft body 310 based on the radial direction R2 and protruding in the radial direction R2 of the shaft body 310. In this case, the first wire 210 may extend from one side of the first wire 210 (i.e., the region fixed to the input shaft) to the other side of the first wire 210 (i.e., the region fixed to the first wire holder) so that i) the first wire 210 may extend in the first circumferential direction C1 of the shaft body 310, ii) the first wire 210 may be bent while surrounding the first protrusion region 320, and then iii) the first wire 210 may extend in the second circumferential direction C2 of the shaft body 310. Therefore, the direction in which the first wire 210 extends may be changed on the basis of the first protrusion region 320, and the tension of the first wire 210 may be transmitted to the output shaft 300 through the first protrusion region 320, such that the output shaft 300 may be rotated.

In addition, the output shaft 300 may further include a second protrusion region 330 provided on the outer surface of the shaft body 310 based on the radial direction R2 and protruding in the radial direction R2 of the shaft body 310. In this case, the second wire 220 may extend from one side of the second wire 220 (i.e., the region fixed to the input shaft) to the other side of the second wire 220 (i.e., the region fixed to the second wire holder) so that i) the second wire 220 may extend in the second circumferential direction C2 of the shaft body 310, ii) the second wire 220 may be bent while surrounding the second protrusion region 330, and then iii) the second wire 220 may extend in the first circumferential direction C1 of the shaft body 310. Therefore, the direction in which the second wire 220 extends may be changed on the basis of the second protrusion region 330, and the tension of the second wire 220 may be transmitted to the output shaft 300 through the second protrusion region 330, such that the output shaft 300 may be rotated.

Referring to FIGS. 1 to 3, the power transmission device 10 may further include a base member 500 provided at one side of the output shaft 300, and the output shaft 300 is rotatably coupled to the base member 500. The input shaft 100 and the drive motor 30 may also be fixed to the base member 500. FIGS. 1 and 2 illustrate an example in which the base member 500 is provided at rear sides of the input and output shafts 100 and 300.

In this case, the power transmission device 10 may further include a third protrusion region 610 provided at one side of the base member 500. The third protrusion region 610 may be configured to bend the first wire 210 so that the direction in which the first wire 210 extends is changed.

In particular, according to embodiments of the present disclosure, the first wire 210 may extend from one side of the first wire 210 (i.e., the region fixed to the input shaft) to the other side of the first wire 210 (i.e., the region fixed to the first wire holder) so that i) the first wire 210 may extend from the input shaft 100 toward the third protrusion region 610, ii) the first wire 210 may be bent while surrounding the third protrusion region 610, and then iii) the first wire 210 may extend in the first circumferential direction C1 of the shaft body 310.

Meanwhile, as illustrated in FIG. 1, a direction in which the third protrusion region 610 protrudes from the base member 500 may be parallel to the second rotation axis A2 which is a central axis about which the output shaft 300 rotates. In addition, the first and second wire holders 410 and 420 may be provided below the output shaft 300, the first wire 210 may extend upward from the first wire holder 410 and be connected to the output shaft 300, and the second wire 220 may extend upward from the second wire holder 420 and be connected to the output shaft 300.

In addition, as illustrated in FIG. 1, the third protrusion region 610 may be spaced apart from the output shaft 300 in the leftward/rightward direction P. The second wire 220 may extend from the second wire holder 420, pass through a space between the third protrusion region 610 and the output shaft 300, and reach the second protrusion region 330.

Therefore, according to embodiments of the present disclosure, a region in which the first and second wires 210 and 220 intersect each other may be formed when the power transmission device 10 is viewed from the front side. More specifically, referring to FIG. 1, a region of the first wire 210, which is bent around the third protrusion region 610 and then surrounds the shaft body 310 in the first circumferential direction C1, may intersect and be spaced apart from a region of the second wire 220 which extends from the input shaft 100 to the second protrusion region 330. More particularly, the regions of the first and second wires 210 and 220, which intersect each other, may be spaced apart from each other in the forward/rearward direction of the power transmission device 10. Therefore, it is possible to prevent the first and second wires 210 and 220 from coming into contact with each other during the process of operating the power transmission device 10.

More particularly, the region of the first wire 210, which surrounds the third protrusion region 610, may become distant from the base member 500 as the region of the first wire 210 becomes closer to the shaft body 310 so that the first and second wires 210 and 220 may be spaced apart from each other in the regions of the first and second wires 210 and 220 which intersect each other.

Meanwhile, as illustrated in FIG. 1, a distance in the leftward/rightward direction P between the output shaft 300 and the region of the first wire 210 which surrounds the input shaft 100 may be longer than a distance in the leftward/rightward direction P between the output shaft 300 and the region of the second wire 220 which surrounds the input shaft 100.

Meanwhile, according to embodiments of the present disclosure, a rotation angle of the output shaft 300 may be restricted to a predetermined range. To this end, referring to FIG. 3, the base member 500 may include a recessed portion 510 formed in a shape recessed in the forward/rearward direction so that a part of the shaft body 310 is inserted into the recessed portion 510. A partial region of the shaft body 310 may be inserted into the recessed portion 510. Therefore, the rotation range of the output shaft 300 may be restricted by the interference between the region of the shaft body 310, which is inserted into the recessed portion 510, and a boundary region of the recessed portion 510. To this end, the recessed portion 510 may have an arc shape extending in parallel with the circumferential directions C1 and C2 of the shaft body 310.

Figure 4:
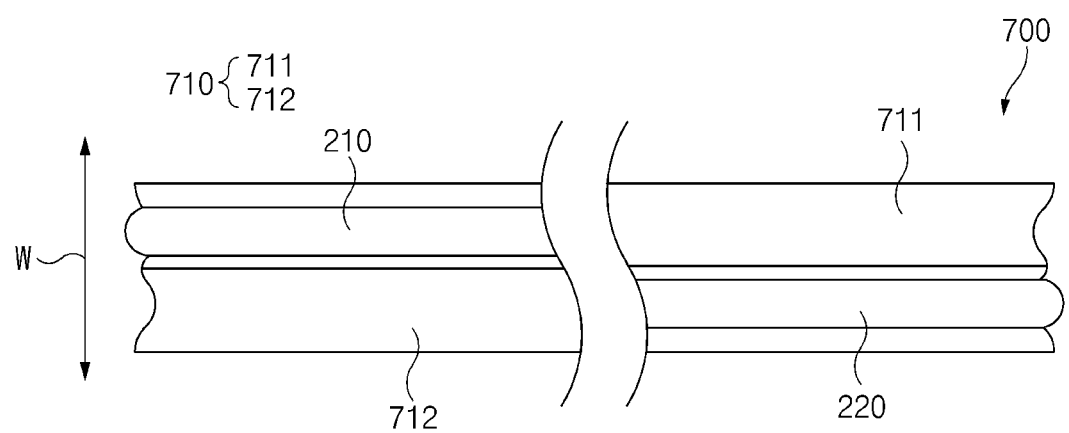
FIG. 4 is a view illustrating an example of a groove region formed in an idler member of the power transmission device according to embodiments of the present disclosure.
Figure 5:
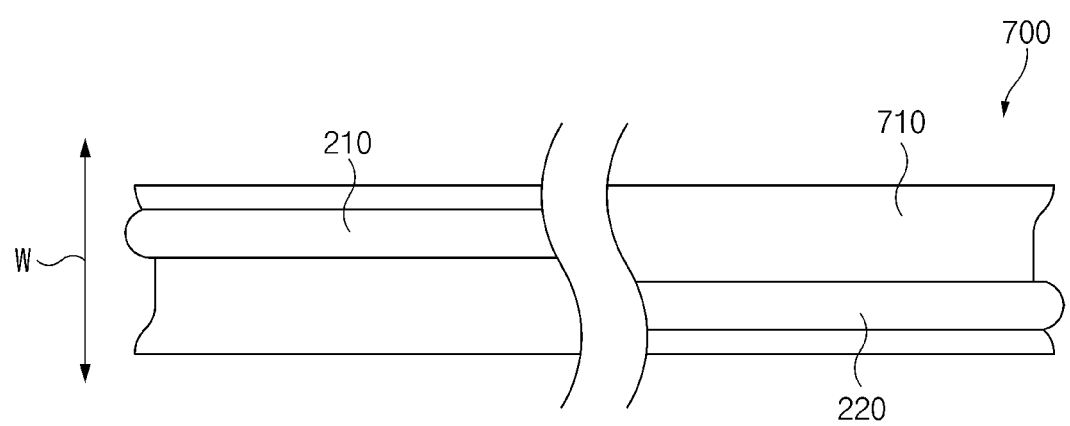
FIG. 5 is a view illustrating another example of the groove region formed in the idler member of the power transmission device according to embodiments of the present disclosure.
Figure 6:
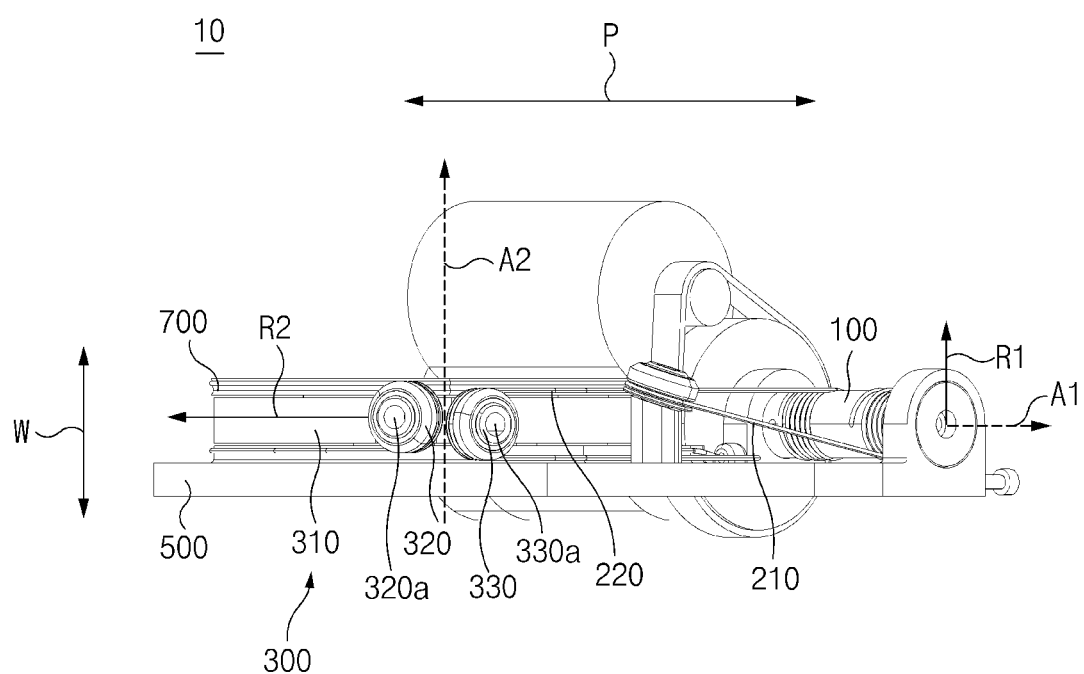
FIG. 6 is a top plan view illustrating the power transmission device according to embodiments of the present disclosure when viewed from above.

FIG. 4 is a view illustrating an example of a groove region formed in an idler member of the power transmission device according to embodiments of the present disclosure, and FIG. 5 is a view illustrating another example of the groove region formed in the idler member of the power transmission device according to embodiments of the present disclosure. In addition, FIG. 6 is a top plan view illustrating the power transmission device according to embodiments of the present disclosure when viewed from above.

Referring to FIGS. 1 to 6, the power transmission device 10 according to embodiments of the present disclosure may further include an idler member 700 disposed to face the base member 500 with the output shaft 300 interposed therebetween, the idler member 700 being coupled to the output shaft 300 and configured to be rotatable relative to the output shaft 300. Referring to the drawings, a size of the idler member 700 may correspond to a size of the output shaft 300. More specifically, a radius of the shaft body 310 in the radial direction R2 of the shaft body 310 may correspond to a radius of the idler member 700. In the present specification, the reference numerals, which are equal to the reference numerals indicating the radial direction R2 and the circumferential directions C1 and C2 of the shaft body, may be used to indicate the radial direction and the circumferential direction of the idler member 700.

According to embodiments of the present disclosure, the first and second wires 210 and 220 may extend in a state in which the first and second wires 210 and 220 are partially in close contact with the idler member 700. More specifically, the first wire 210 may extend from one side of the first wire 210 (i.e., the region fixed to the input shaft) to the other side of the first wire 210 (i.e., the region fixed to the first wire holder) so that i) the first wire 210 may extend in the first circumferential direction C1 in a state of being in close contact with an outer surface of the idler member 700 based on the radial direction R2, ii) the first wire 210 may be bent while surrounding the first protrusion region 320, and then iii) the first wire 210 may extend in the second circumferential direction C2 in a state of being in close contact with the outer surface of the shaft body 310 based on the radial direction R2. In addition, the second wire 220 may extend from one side of the second wire 220 (i.e., the region fixed to the input shaft) to the other side of the second wire 220 (i.e., the region fixed to the second wire holder) so that i) the second wire 220 may extend in the second circumferential direction C2 in a state of being in close contact with the outer surface of the idler member 700 based on the radial direction R2, ii) the second wire 220 may be bent while surrounding the second protrusion region 330, and then iii) the second wire 220 may extend in the first circumferential direction C1 in a state of being in close contact with the outer surface of the shaft body 310 based on the radial direction R2.

According to the power transmission device 10 according to embodiments of the present disclosure, a direction in which the first wire 210 surrounds the output shaft 300 and the idler member 700 is different from a direction in which the second wire 220 surrounds the output shaft and the idler member 700.

For example, when the input shaft 100 rotates so that the first wire 210 is unwound from the input shaft 100, the second wire 220 may be wound around the input shaft 100. In this case, the output shaft 300 rotates counterclockwise based on FIG. 2. In addition, the movement speed of the region of the first wire 210, which is in close contact with the idler member 700, is twice the movement speed of the region of the first wire 210 which is in close contact with the outer surface of the shaft body 310. The movement speed of the region of the second wire 220, which is in close contact with the idler member 700, is twice the movement speed of the region of the second wire 220 which is in close contact with the outer surface of the shaft body 310. This may be understood on the basis of the principle of the movable pulley. That is, the first and second wires 210 and 220 may correspond to ropes of the movable pulleys, and the first and second protrusion regions 320 and 330 may correspond to movable rotary shafts of the movable pulleys.

Referring to FIGS. 1 to 3, the power transmission device 10 may further include a fourth protrusion region 620 provided at one side of the base member 500, and the first wire 210 is in close contact with an outer surface of the fourth protrusion region 620. In this case, the first wire 210 may be bent in the region of the first wire 210 being in close contact with the fourth protrusion region 620, and the fourth protrusion region 620 may be provided between the output shaft 300 and the first wire holder 410 on the basis of the direction in which the first wire 210 extends. The fourth protrusion region 620 may be configured to change the direction in which the first wire 210 extends before the first wire 210 extending from the input shaft 100 extends to the shaft body 310 and the idler member 700 so that the directions in which the first and second wires 210 and 220 surround the output shaft 300 and the idler member 700 may be opposite to each other.

Meanwhile, referring to FIGS. 4 and 5, the idler member 700 may include a groove region 710 recessed inward from the outer surface of the shaft body 310 based on the radial direction R2, and extending in the circumferential directions C1 and C2. In this case, the regions of the first and second wires 210 and 220, which are in close contact with the idler member 700, may be in close contact with the groove region 710. The groove region 710 may be configured to prevent the first and second wires 210 and 220 from separating from the idler member 700.

In this case, referring to FIGS. 4 to 6, according to an embodiment of the present disclosure, the region of the first wire 210, which is in close contact with the groove region 710, may be spaced apart, in a width direction W of the idler member 700, from the region of the second wire 220 which is in close contact with the groove region 710. According to an embodiment of the present disclosure for implementing the above-mentioned configuration, a center 320a of the first protrusion region 320 and a center 330a of the second protrusion region 330 may be spaced apart from each other in the width direction W of the output shaft 300. FIG. 6 illustrates that the center 320a of the first protrusion region 320 is further spaced apart outward from the base member 500 than the center 330a of the second protrusion region 330.

However, in contrast, according to another embodiment of the present disclosure, the region of the first wire 210, which is in close contact with the groove region 710, and the region of the second wire 220, which is in contact with the groove region 710, may be coincident with each other in the width direction W of the idler member 700. According to another embodiment of the present disclosure for implementing the above-mentioned configuration, the center 320a of the first protrusion region 320 and the center 330a of the second protrusion region 330 may be coincident with each other in the width direction W of the output shaft 300.

Meanwhile, referring to FIG. 4, in the power transmission device 10 according to embodiments of the present disclosure, the groove region 710 may be divided into a plurality of regions. More specifically, the groove region 710 may include a first groove region 711 and a second groove region 712 spaced apart from the first groove region 711 in the width direction W of the idler member 700. In addition, the first wire 210 may be in close contact with the first groove region 711, and the second wire 220 may be in close contact with the second groove region 712. However, as illustrated in FIG. 5, only the single groove region 710 may be provided, and both the first and second wires 210 and 220 may be in close contact with the single groove region 710.

Figure 7:
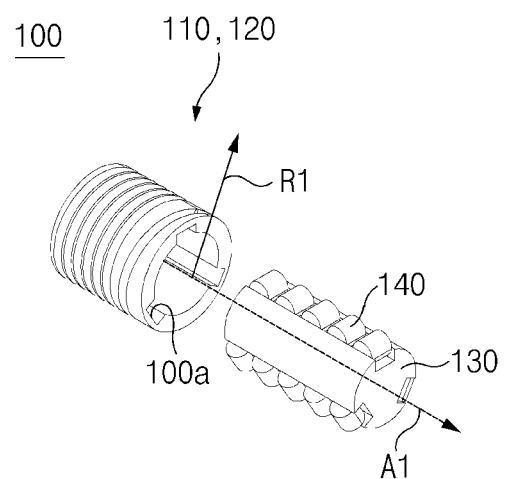
FIG. 7 is an exploded view of an input shaft of the power transmission device according to embodiments of the present disclosure.
Figure 8:
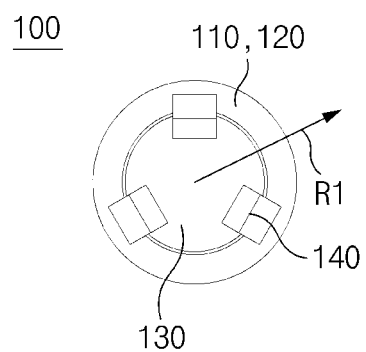
FIG. 8 is a cross-sectional view of the input shaft of the power transmission device according to embodiments of the present disclosure.
Figure 9:
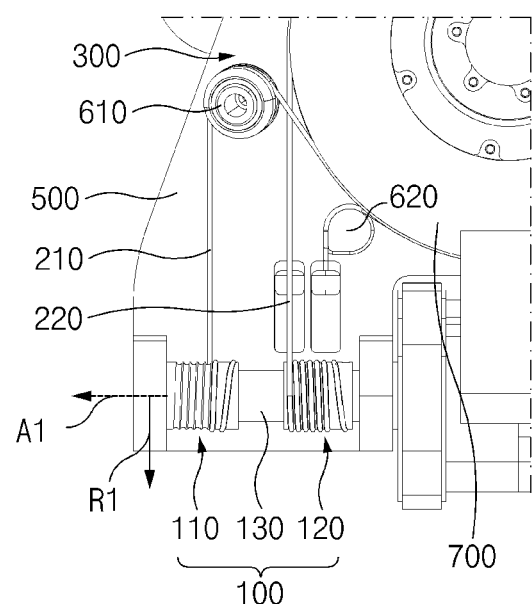
FIG. 9 is a front view illustrating a state in which first and second sliding members are moved when a first wire is unwound from the input shaft and a second wire is wound around the input shaft by the rotation of the input shaft of the power transmission device according to embodiments of the present disclosure.
Figure 10:
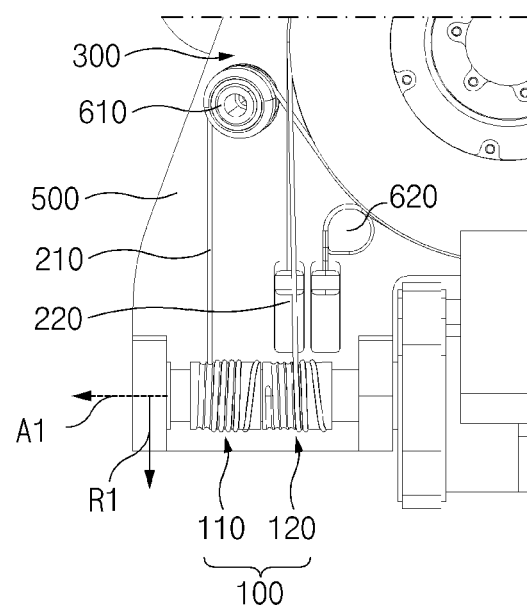
FIG. 10 is a front view illustrating a state in which the first and second sliding members are moved when the second wire is unwound from the input shaft and the first wire is wound around the input shaft by the rotation of the input shaft of the power transmission device according to embodiments of the present disclosure.

FIG. 7 is an exploded view of the input shaft of the power transmission device according to embodiments of the present disclosure, and FIG. 8 is a cross-sectional view of the input shaft of the power transmission device according to embodiments of the present disclosure. FIG. 9 is a front view illustrating a state in which first and second sliding members are moved when the first wire is unwound from the input shaft and the second wire is wound around the input shaft by the rotation of the input shaft of the power transmission device according to embodiments of the present disclosure, and FIG. 10 is a front view illustrating a state in which the first and second sliding members are moved when the second wire is unwound from the input shaft and the first wire is wound around the input shaft by the rotation of the input shaft of the power transmission device according to embodiments of the present disclosure.

As described above, the first and second wires 210 and 220 may surround the outer surface of the input shaft 100. However, in a case in which a point at which the first and second wires 210 and 220 begin to be unwound from the input shaft 100 by the rotation of the input shaft 100 is changed in a longitudinal direction of the input shaft 100, there may occur a fine difference between a distance by which the first wire 210 is unwound from the input shaft 100 by the rotation of the input shaft 100 and a distance by which the second wire 220 is wound around the input shaft 100 (vice versa). In this case, linearity may not be implemented between the rotational speed of the output shaft 300 and the rotational speed of the input shaft 100, and the first and second wires 210 and 220 may be abnormally wound around or unwound from the input shaft 100.

According to embodiments of the present disclosure for preventing the above-mentioned problem, the input shaft 100 may be configured such that the points at which the first and second wires 210 and 220 begin to be unwound from the input shaft 100 are constant.

More specifically, the input shaft 100 may include a first sliding member 110 disposed on the outer surface of the input shaft 100 based on the radial direction R1 and having a first screw thread region having a recessed shape and configured to accommodate the first wire 210, a second sliding member 120 disposed on the outer surface of the input shaft 100 based on the radial direction R1 and having a second screw thread region having a recessed shape and configured to accommodate the second wire 220, and an insertion member 130 inserted into internal spaces of the sliding members 110 and 120 in a direction parallel to the first rotation axis A1. In this case, the first and second sliding members 110 and 120 may be movable relative to the insertion member 130 in the direction parallel to the first rotation axis A1.

More specifically, the input shaft 100 may further include roller members 140 fixed to an outer peripheral surface of the insertion member 130 and configured to be rotatable so that the first and second sliding members 110 and 120 may slide relative to the insertion member 130. Therefore, the roller member 140 may be provided in plural, and the plurality of roller members 140 may be disposed in a direction parallel to the first rotation axis A1. Some of the roller members 140 may face the first sliding member 110, and the other roller members 140 may face the second sliding member 120.

Meanwhile, the first sliding member 110 and the insertion member 130 may rotate together about the first rotation axis A1, and the second sliding member 120 and the insertion member 130 may rotate together about the first rotation axis A1. To this end, inner peripheral recessed regions 100a each having a recessed shape corresponding to the roller member 140 may be formed in inner peripheral surfaces of the first and second sliding members 110 and 120, and the roller members 140 may be inserted into the inner peripheral recessed regions 100a. Therefore, according to embodiments of the present disclosure, the first and second sliding members 110 and 120 may be moved relative to the insertion member 130 in the direction parallel to the first rotation axis A1 by means of the roller members 140. In contrast, the interference between the roller members 140 and the inner peripheral recessed regions 100a may allow the insertion member 130 to rotate about the first rotation axis A1 together with the first and second sliding members 110 and 120.

Therefore, as illustrated in FIGS. 9 and 10, the first and second sliding members 110 and 120 may be moved in the direction parallel to the first rotation axis A1 by the tension of the first and second wires 210 and 220 when the input shaft 100 rotates such that the first wire 210 is wound around or unwound from the first sliding member 110 and the second wire 220 is wound around or unwound from the second sliding member 120. Therefore, according to embodiments of the present disclosure, regardless of the rotation of the input shaft 100, the point at which the first wire 210 begins to be unwound from the first sliding member 110 may be constant, and the point at which the second wire 220 begins to be unwound from the second sliding member 120 may be constant.

Figure 11:
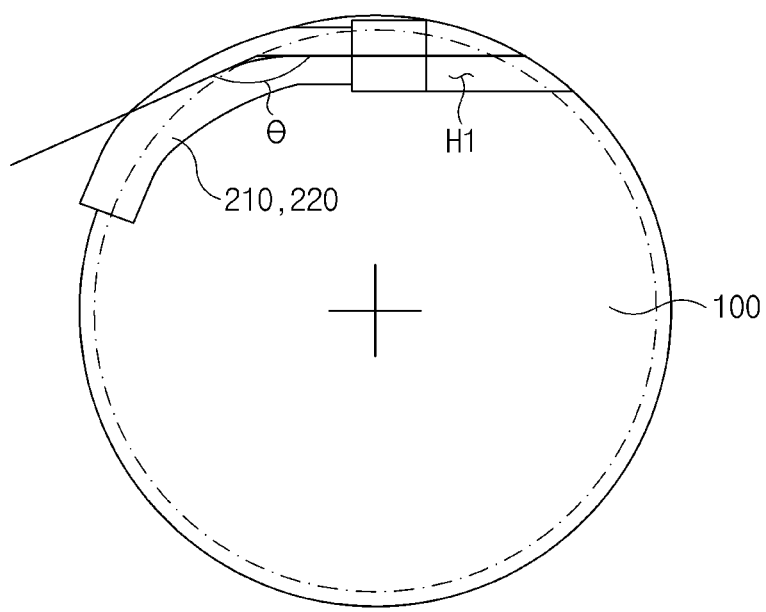
FIG. 11 is a cross-sectional view illustrating a state in which the wire is fixed to the input shaft of the power transmission device according to embodiments of the present disclosure.

FIG. 11 is a view cross-sectional view illustrating a state in which the wire is fixed to the input shaft of the power transmission device according to embodiments of the present disclosure. Hereinafter, a method of fixing the wires 210 and 220 to the input shaft 100 of the power transmission device according to embodiments of the present disclosure will be described with reference to FIG. 11. The following description will be focused on the first wire 210 and the first sliding member, but the same may apply to the second wire 220 and the second sliding member.

Referring to FIG. 11, a fixing hole H1 may be formed in the outer surface of the input shaft 100 based on the radial direction R1, and one end of the first wire 210 may be fixedly inserted into the fixing hole H1. More specifically, the fixing hole H1 may be formed in the outer surface of the first sliding member 110 (see FIGS. 7 and 8).

In this case, according to embodiments of the present disclosure, at a point at which the first wire 210 begins to be inserted into the fixing hole H1, an angle θ defined between a direction of the first wire 210 indicated by a dotted line and a direction in which the fixing hole H1 extends may be larger than 90 degrees or an obtuse angle. In this case, a degree to which the first wire 210 is bent to be inserted into the fixing hole H1 may be minimized, and damage to the first wire 210 occurring during the process of operating the power transmission device 10 may be minimized, which makes it possible to increase a lifespan of the first wire 210.

Figure 12:
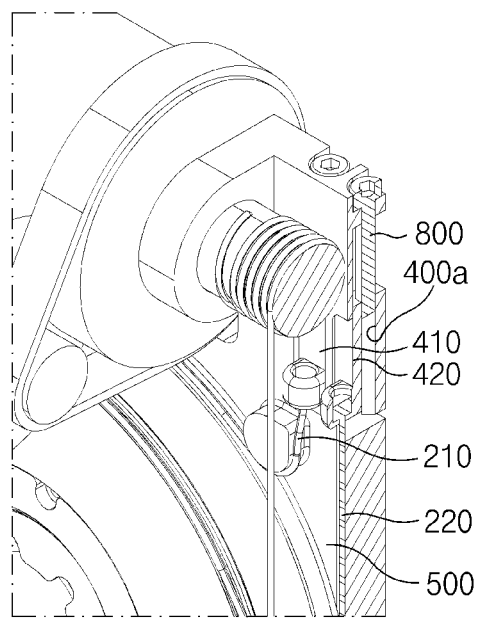
FIG. 12 is an enlarged view of a coupling structure between a base member and a wire holder of the power transmission device according to embodiments of the present disclosure.
Figure 13:
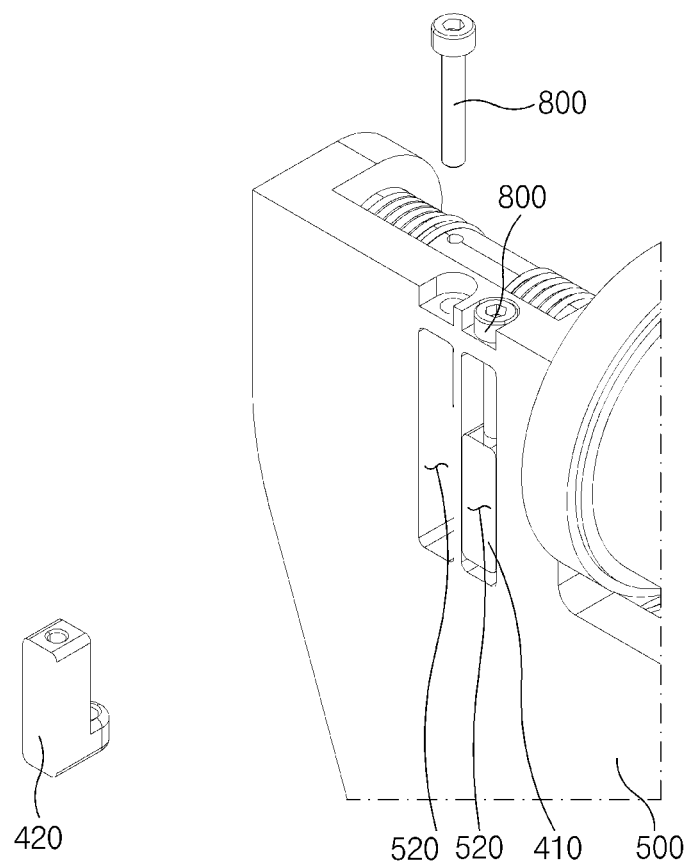
FIG. 13 is an exploded view illustrating a state before the base member and the wire holder of the power transmission device according to embodiments of the present disclosure are assembled.

FIG. 12 is an enlarged view of a coupling structure between the base member and the wire holder of the power transmission device according to embodiments of the present disclosure, and FIG. 13 is an exploded view illustrating a state before the base member and the wire holder of the power transmission device according to embodiments of the present disclosure are assembled.

Referring to FIGS. 12 and 13, accommodation spaces 520 may be formed in the base member 500 and accommodate the first and second wire holders 410 and 420. The first and second wire holders 410 and 420 may be respectively inserted into the accommodation spaces 520 and provided to be movable in the accommodation spaces 520. Therefore, according to embodiments of the present disclosure, the tension of the first and second wires 210 and 220 may be adjusted by moving the first and second wire holders 410 and 420.

More specifically, internal thread regions 400a may be respectively formed in the first and second wire holders 410 and 420. The power transmission device 10 may further include external thread members 800 inserted into and coupled to the internal thread regions 400a. Therefore, positions of the first and second wire holders 410 and 420 may be adjusted by rotating the external thread members 800, such that the tension of the first and second wires 210 and 220 may be adjusted.

Referring to FIGS. 12 and 13, in the regions in which the first and second wire holders 410 and 420 are inserted into the accommodation spaces 520, a cross-section of each of the accommodation spaces 520 based on the direction perpendicular to the longitudinal direction of the external thread member 800 may have a polygonal shape, and a cross-section of each of the first and second wire holders 410 and 420 based on the direction perpendicular to the longitudinal direction of the external thread member 800 may have a polygonal shape. This may be to allow the first and second wire holders 410 and 420 not to rotate but to slide in the accommodation spaces 520 when the external thread members 800 rotate. For example, the polygonal shape may be a quadrangular shape.

Figure 14:
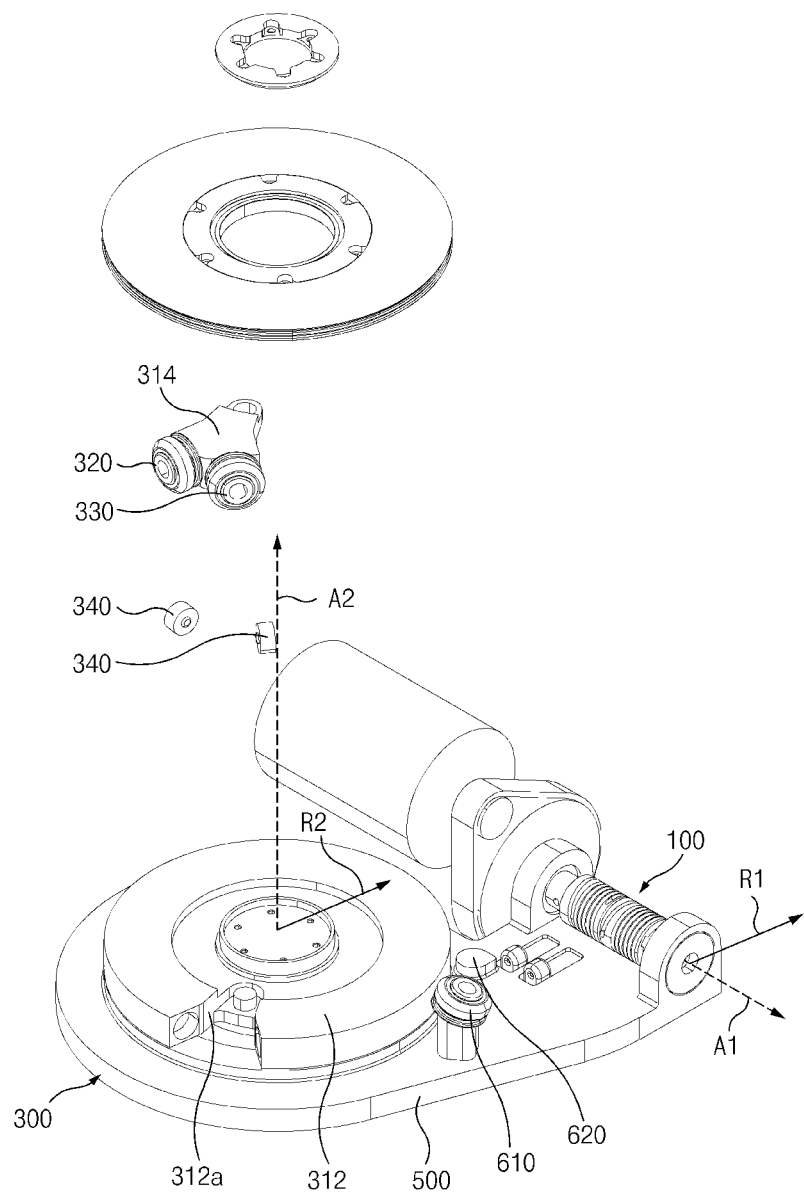
FIG. 14 is a view illustrating a state in which some components of an output shaft and an idler member of the power transmission device according to embodiments of the present disclosure are disassembled.
Figure 15:
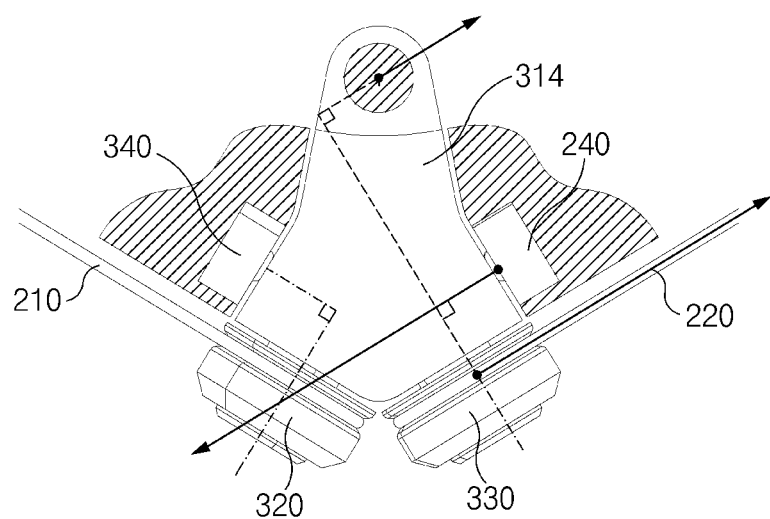
FIG. 15 is a cross-sectional view illustrating a coupling structure between a block region, a first protrusion region, a second protrusion region, and a pressure sensor member of the power transmission device according to embodiments of the present disclosure.

FIG. 14 is a view illustrating a state in which some components of the output shaft and the idler member of the power transmission device according to embodiments of the present disclosure are disassembled, and FIG. 15 is a cross-sectional view illustrating a coupling structure between a block region, the first protrusion region, the second protrusion region, and a pressure sensor member of the power transmission device according to embodiments of the present disclosure.

The shaft body 310 of the output shaft 300 may be divided into a plurality of regions, and the plurality of regions may be assembled to define a predetermined shape (e.g., a circular plate shape).

More specifically, as illustrated in FIGS. 14 and 15, the shaft body 310 may include a body region 312 having an outer peripheral recessed region 312a formed in a shape recessed inward from an outer peripheral surface of the body region 312 and a block region 314 inserted into the outer peripheral recessed region 312a and having the first and second protrusion regions 320 and 330 formed on the outer surface of the shaft body 310 based on the radial direction R2.

In addition, the output shaft 300 may further include pressure sensor members 340 formed in regions in which the block region 314 and the body region 312 face each other in the first and second circumferential directions C1 and C2. The pressure sensor members 340 may be configured to measure torque of the output shaft 300 by measuring forces applied by the first and second wires 210 and 220 to the output shaft 300. For example, as illustrated in FIGS. 14 and 15, the pressure sensor members 340 may be respectively provided on a lateral surface of the block region 314 based on the first circumferential direction C1 and a lateral surface of the block region 314 based on the second circumferential direction C2.

In this case, according to embodiments of the present disclosure, i) a direction perpendicular to a surface of the block region 314 which is in close contact with the pressure sensor member 340 may be parallel to ii) the direction in which the first wire 210 extends from the first protrusion region 320 and the direction in which the second wire 220 extends from the second protrusion region 330. This arrangement allows easy calculation of the forces applied by the first and second wires 210 and 220 to the block region 314.

Meanwhile, referring to FIG. 3, the power transmission device 10 may further include a first bearing 900 coupled to the output shaft 300 and the idler member 700, and a second bearing 950 coupled to the output shaft 300 and the base member 500.

In this case, the first bearing 900 may include a first inner race 901 coupled to the shaft body 310, a first outer race 902 coupled to the idler member 700, and a first rolling element 903 provided between the first inner race 901 and the first outer race 902. In addition, the second bearing 950 may include a second inner race 951 coupled to the shaft body 310, a second outer race 952 coupled to the base member 500, and a second rolling element 953 provided between the second inner race 951 and the second outer race 952. For example, the first and second bearings 900 and 950 may each be a crossed roller bearing.

Robot

Figure 16:
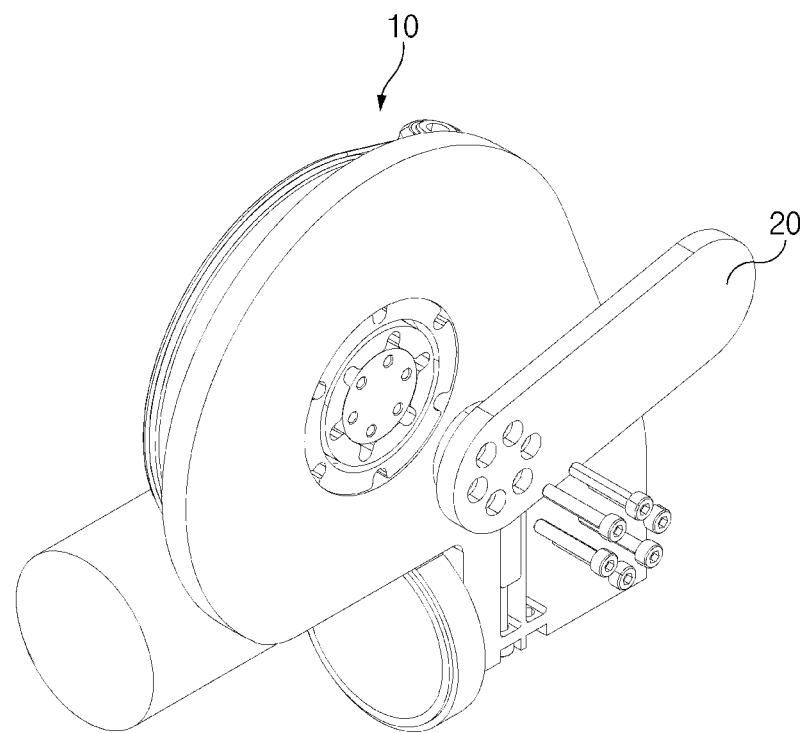
FIG. 16 is an exploded view illustrating a state before a rotary member and a power transmission device of a robot according to embodiments of the present disclosure are coupled.

FIG. 16 is an exploded view illustrating a state before a rotary member and a power transmission device of a robot according to embodiments of the present disclosure are coupled.

Referring to FIG. 16, the robot according to embodiments of the present disclosure may include the above-mentioned power transmission device 10 and a rotary member 20 configured to rotate by receiving a rotational force from the power transmission device 10. In this case, the rotary member 20 may be fixed relative to the output shaft 300. The configuration in which the rotary member 20 is fixed relative to the output shaft 300 may be understood as a concept including not only that the rotary member 20 is coupled directly to the output shaft 300 but also that the rotary member 20 is coupled directly to the first inner race 901 of the first bearing 900, such that the rotary member 20 is coupled indirectly to the output shaft 300.

For example, the rotary member 20 may be provided on the robot and configured to mimic motions of joints of fingers or toes. The power transmission device 10 may be configured to provide power to the rotary member 20.

Meanwhile, because the above-mentioned description of the power transmission device 10 according to embodiments of the present disclosure may also be equally applied to the robot according to embodiments of the present disclosure, the description of the power transmission device of the robot according to embodiments of the present disclosure may be replaced with the description of the power transmission device according to embodiments of the present disclosure.

The present disclosure has been described with reference to the limited embodiments and the drawings, but the present disclosure is not limited thereto. The present disclosure may be carried out in various forms by those skilled in the art, to which the present disclosure pertains, within the technical spirit of the present disclosure and the scope equivalent to the appended claims.

What is claimed is:

1. A power transmission device comprising:
    an input shaft rotatable about a first rotation axis;
    first wire and second wire configured to be wound around an outer surface of the input shaft based on a first radial direction, each of the first and second wires having a first side fixed to the input shaft, the first wire and the second wire being separate;
    an output shaft rotatable about a second rotation axis, the output shaft comprising a shaft body, wherein the first and second wires surround an outer surface of the shaft body based on a second radial direction; and
    first and second wire holders to which a second side of the first wire and a second side of the second wire are respectively fixed; and
    wherein the first wire extends from the first side of the first wire to the second side of the first wire so that the first wire extends in a first circumferential direction of the shaft body, and then the first wire extends in a second circumferential direction opposite to the first circumferential direction of the shaft body.

2. The power transmission device of claim 1, wherein the second wire extends from the first side of the second wire to the second side of the second wire so that the second wire extends in the second circumferential direction of the shaft body, and then the second wire extends in the first circumferential direction of the shaft body.

3. The power transmission device of claim 2, wherein:
    the output shaft further comprises a first protrusion region provided on the outer surface of the shaft body based on the second radial direction and protruding in the second radial direction of the shaft body; and
    the first wire extends from the first side of the first wire to the second side of the first wire so that the first wire extends in the first circumferential direction of the shaft body, the first wire is bent while surrounding the first protrusion region, and then the first wire extends in the second circumferential direction of the shaft body.

4. The power transmission device of claim 3, wherein:
    the output shaft further comprises a second protrusion region provided on the outer surface of the shaft body based on the second radial direction and protruding in the second radial direction of the shaft body; and
    the second wire extends from the first side of the second wire to the second side of the second wire so that the second wire extends in the second circumferential direction of the shaft body, the second wire is bent while surrounding the second protrusion region, and then the second wire extends in the first circumferential direction of the shaft body.

5. The power transmission device of claim 1, wherein the first and second wire holders are provided below the output shaft, the first wire extends upward from the first wire holder, and the second wire extends upward from the second wire holder.

6. The power transmission device of claim 1, wherein a distance in a leftward/rightward direction parallel with the first rotation axis between the output shaft and a region of the first wire that is wound around the input shaft is longer than a distance in the leftward/rightward direction between the output shaft and the region of the second wire that is wound around the input shaft.

7. A power transmission device comprising:
an input shaft rotatable about a first rotation axis;
first wire and second wire configured to be wound around an outer surface of the input shaft based on a first radial direction, each of the first and second wires having a first side fixed to the input shaft, the first wire and the second wire being separate;
an output shaft rotatable about a second rotation axis, the output shaft comprising:
a shaft body , wherein the first and second wires surround an outer surface of the shaft body based on a second radial direction;
a first protrusion region provided on the outer surface of the shaft body based on the second radial direction and protruding in the second radial direction of the shaft body;
a second protrusion region provided on the outer surface of the shaft body based on the second radial direction and protruding in the second radial direction of the shaft body; and
first and second wire holders to which a second side of the first wire and a second side of the second wire are respectively fixed;
a base member provided at one side of the output shaft, wherein the output shaft is rotatably coupled to the base member; and
a third protrusion region disposed at one side of the base member;
wherein the first wire extends from the first side of the first wire to the second side of the first wire so that the first wire extends from the input shaft toward the third protrusion region, the first wire is bent while surrounding the third protrusion region, and the first wire extends in a first circumferential direction of the shaft body; and
wherein the second wire extends from the first side of the second wire to the second side of the second wire so that the second wire extends in a second circumferential direction opposite to the first circumferential direction of the shaft body, the second wire is bent while surrounding the second protrusion region, and then the second wire extends in the first circumferential direction of the shaft body.

8. The power transmission device of claim 7, wherein a direction in which the third protrusion region protrudes from the base member is parallel to the second rotation axis, the second rotation axis being a central axis about which the output shaft is configured to rotate.

9. The power transmission device of claim 7, wherein the third protrusion region is spaced apart from the output shaft in a leftward/rightward direction parallel with the first rotation axis, and the second wire extends from the second wire holder, passes through a space between the third protrusion region and the output shaft, and reaches the second protrusion region.

10. The power transmission device of claim 7, wherein a region of the first wire that is bent around the third protrusion region and then surrounds the shaft body in the first circumferential direction intersects when viewed from a distance parallel with the second rotation axis and is spaced apart from a region of the second wire that extends from the input shaft to the second protrusion region.

11. The power transmission device of claim 7, wherein the base member comprises a recessed portion having a recessed shape and configured such that a part of the shaft body is inserted into the recessed portion, and
wherein interference between the recessed portion and a region of the shaft body inserted into the recessed portion restricts a rotation range of the output shaft.

12. The power transmission device of claim 7, wherein a center of the first protrusion region and a center of the second protrusion region are coincident with each other in a width direction of the output shaft, the width direction parallel with the second rotation axis.

13. The power transmission device of claim 7, further comprising a fourth protrusion region provided at one side of the base member and having an outer surface with which the first wire is in close contact, wherein the first wire is bent in a region of the first wire that is in close contact with the fourth protrusion region, and the fourth protrusion region is provided between the output shaft and the first wire holder based on a direction in which the first wire extends.

14. A power transmission device comprising:
an input shaft rotatable about a first rotation axis;
first wire and second wire configured to be wound around an outer surface of the input shaft based on a first radial direction, each of the first and second wires having a first side fixed to the input shaft, the first wire and the second wire being separate;
an output shaft rotatable about a second rotation axis, the output shaft comprising:
a shaft body, wherein the first and second wires surround an outer surface of the shaft body based on a second radial direction;
a first protrusion region provided on the outer surface of the shaft body based on the second radial direction and protruding in the second radial direction of the shaft body;
a second protrusion region provided on the outer surface of the shaft body based on the second radial direction and protruding in the second radial direction of the shaft body; and
first and second wire holders to which a second side of the first wire and a second side of the second wire are respectively fixed;
a base member provided at one side of the output shaft, wherein the output shaft is rotatably coupled to the base member;
a third protrusion region disposed at one side of the base member;
an idler member facing the base member with the output shaft interposed therebetween, the idler member being coupled to the output shaft and rotatable relative to the output shaft;
wherein the first wire extends from the first side of the first wire to the second side of the first wire so that the first wire extends in a first circumferential direction in a state of being in close contact with an outer surface of the idler member based on the second radial direction, the first wire is bent while surrounding the first protrusion region, and then the first wire extends in a second circumferential direction opposite to the first circumferential direction of the shaft body in a state of being in close contact with the outer surface of the shaft body based on the second radial direction; and wherein the second wire extends from the first side of the second wire to the second side of the second wire so that the second wire extends in the second circumferential direction of the shaft body, the second wire is bent while surrounding the second protrusion region, and then the second wire extends in the first circumferential direction of the shaft body.

15. The power transmission device of claim 14, wherein the second wire extends from the first side of the second wire to the second side of the second wire so that the second wire extends in the second circumferential direction in a state of being in close contact with the outer surface of the idler member based on the second radial direction, the second wire is bent while surrounding the second protrusion region, and then the second wire extends in the first circumferential direction in a state of being in close contact with the outer surface of the shaft body based on the second radial direction.

16. The power transmission device of claim 14, wherein a radius of the shaft body based on the second radial direction of the shaft body corresponds to a radius of the idler member.

17. The power transmission device of claim 14, wherein the idler member comprises a groove region recessed inward from the outer surface of the shaft body based on the second radial direction and extending in the first and the second circumferential directions, and regions of the first and second wires that are in close contact with the idler member are in close contact with the groove region.

18. The power transmission device of claim 17, wherein a region of the first wire that is in close contact with the groove region and a region of the second wire that is in close contact with the groove region are coincident with each other in a width direction of the idler member.

19. The power transmission device of claim 17, wherein a region of the first wire that is in close contact with the groove region and a region of the second wire that is in close contact with the groove region are spaced apart from each other in a width direction of the idler member.

20. The power transmission device of claim 17, wherein the groove region comprises:

a first groove region; and a second groove region spaced apart from the first groove region in a width direction of the idler member, wherein the first wire is in close contact with the first groove region and the second wire is in close contact with the second groove region.

\* \* \* \* \*